Dec. 25, 1945.  L. E. KIBLER  2,391,630
LYE PEELER
Filed Jan. 11, 1944
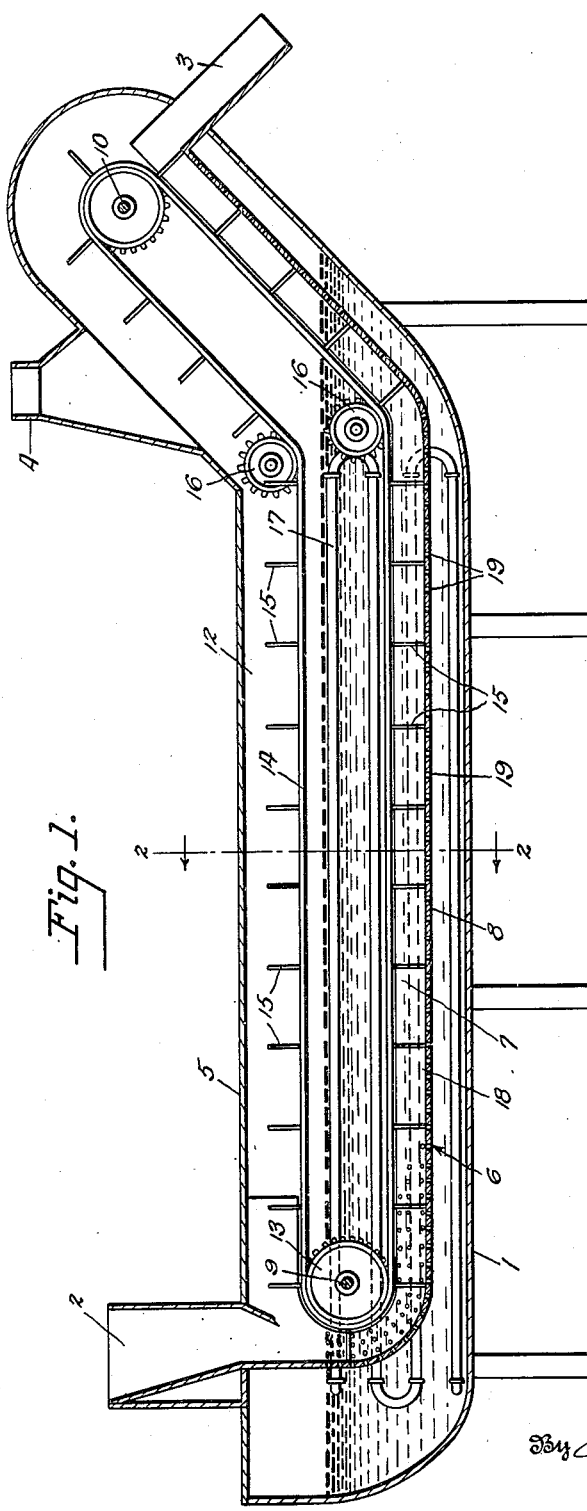
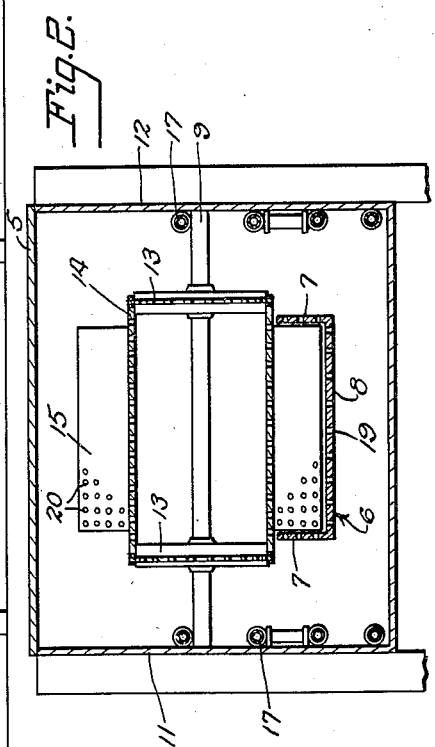
Inventor
L. E. Kibler Patented Dec. 25, 1945

2,391,630

UNITED STATES PATENT OFFICE 2,391,630

LYE PEELER

Louis E. Kibler, Baltimore, Md., assignor to A. K. Robins & Company, Inc., Baltimore, Md., a corporation of Maryland Application January 11, 1944, Serial No. 517,856

3 Claims. (Cl. 146—47)

This invention relates to lye peeling apparatus for potatoes, the construction of which is so designed as to meet all the problems which attend the peeling of potatoes, by the lye method.

Due to their irregular shape, potatoes are not graded according to size as are spherical fruits, so that they come to the peeler in mixed sizes, some large and some small. Some sink in lye solution, while others float, dependent upon their state of maturity. No two are alike in shape; all are characterized by the presence of elevations and compressions in their skin contour.

Notwithstanding these individual variations, the results of the peeling process must be uniform. Every part of the potato must be contacted by the lye, and subjected to the attrition which detaches and removes the loosened skin particles. The duration of the dye bath must be uniform for all the potatoes. If they are undertreated, the skin will not be perfectly removed; if overtreated, the lye penetrates into the potato, making its complete eradication by washing difficult. The necessity for uniform lye treatment requires that the duration of immersion must be uniform, that the potatoes be continually subjected to rolling agitation and attritive intercontact, also that the lye solution be kept at uniform strength and reasonably free from skin debris in the region of immersion, otherwise, the interstices between the potatoes will become clogged, preventing uniform distribution of the lye solution about the potatoes, and creating regions of stagnation in which the lye solution becomes depleted and inactive.

All of these factors have been considered in the subject invention, which has for its principal objects:

To convey the potatoes through the lye solution beneath a submerged conveyor, whereby none of the potatoes float, but all are submerged;

To convey all of the potatoes through the lye solution at the same rate of speed and for the same duration, so that all are equally subjected to the lye;

To convey the potatoes in a submerged perforated trough surrounded on all sides by the lye bath, whereby lye from the top, bottom and sides of the bath is entrained, through the perforations, into the current of solution moving with the potatoes, thereby maintaining the concentration of the lye in contact with the potatoes constant and clearing the skin debris from the surfaces of the potatoes;

To provide a region of turbulence in the lye solution at the point where the potatoes emerge from said solution, so that the surfaces of the peeled potatoes are kept free from recontamination by the skin debris as they rise above the surface of the lye solution;

To provide means for heating this lye solution in regions relatively remote from the path of movement of the potatoes whereby the potatoes will not be subjected to extremes of heat and no inadvertent cooking effect will be produced.

With these and other objects in view, the invention comprises the apparatus illustrated in the drawing which accompanies and forms a part of the following specification and throughout the several figures of which the same characters of reference have been employed to designate identical parts.

In the drawing:

Figure 1 is a longitudinal vertical section through a lye peeler for potatoes, embodying the principles of the invention;

Figure 2 is a vertical cross-section taken along the line 2—2 of Figure 1.

Referring now in detail to the figures, the numeral 1 represents an elongated tank having a hopper 2 adjacent one end for feeding unpeeled potatoes into the tank, a chute 3 adjacent the opposite end from which the peeled potatoes are discharged into a washer, not shown, and a stack or vent 4, providing for the escape of steam and the fumes incident to the lye treatment. The tank is otherwise enclosed by the cover 5. The posterior portion of the tank slopes upward, as shown, to provide for the lifting of the potatoes above the level of the solution within the tank prior to their discharge, the chute 3 being necessarily above said liquid level.

Within the tank and spaced from the sides and bottom thereof, as shown in Figure 2, is the trough 6, having perforated sides 7 and perforated bottom 8. The anterior end of the trough extends in an upward direction, joining the hopper 2 and at the posterior end of the tank the trough extends upwardly, communicating with the chute 3. Conveyor shafts 9 and 10 extend transversely of the tank adjacent its anterior and posterior ends, being journaled in bearings, not shown, in the opposite side walls 11 and 12 of the tank. The shaft 10 is in the elevated portion of the tank adjacent the chute 3. One of the shafts 9 or 10 is driven. Sprockets 13 are mounted in spaced relation of the shafts 9 and 10, preferably at such distance apart as to be outside of the vertical plane embracing the sides 7 of the trough 6. Said sprockets intermesh with an endless perforated conveyor 14, having transverse vanes 15 secured to the outer side thereof and perpendicular thereto. The lateral margins of the conveyor extend beyond the vanes and are engaged by the direction changing rollers 16, one bearing against the other side of the upper flight and the other against the inner side of the lower flight of said conveyor adjacent the point where the lower flight emerges from the surface level 16 of the lye solution within said tank. The vanes 15 are of such shape and size as to freely fit within the trough 6, the lower flight of the conveyor 14 constituting a perforated top for said trough.

Steam pipes 17 are mounted on the side walls 11 and 12 within said tank, for the purpose of heating the lye solution.

It will be understood that the trough 6, together with the lower flight of the conveyor 14, forms a closed perforated conduit 18, open to the hopper 2 at its anterior end, and to the chute 3 at its posterior end, and traversed by the vanes 15 of the conveyor which forms spaced partitions in the trough, defining between them continuously moving compartments. Potatoes which are introduced enmasse into the hopper 2 are entrapped between adjacent vanes of the conveyor and carried beneath the lye solution. Since the potatoes are confined within the conduit 18, none can sink to the bottom of the lye bath, and none can float to its surface. All must travel in a confined path intermediate the top and bottom of the lye bath and spaced from the sides thereof. All of the surfaces of all of the potatoes are thus submerged and subjected to the lye bath for the same duration. The current set up within the conduit 18 by the movement of the vanes 15 and the potatoes entrains lye solution through the perforations in the top, bottom and sides of said conduit, the solution from all sides mixing within said conduit so as to be of uniform strength throughout and impinging upon the potatoes through the perforations in jets, washing the potatoes free of the dislodged skin debris. Furthermore, since the bottom and sides of the conduit 18 are stationary, while the top constituted by the lower flight of the conveyor 14, and the flights, moves, the potatoes will be given a rolling action with respect to the surfaces of the apparatus which they contact, and with respect to one another, the attrition of their frictional contact rubbing off all skin particles loosened by the lye. The skin debris will for the most part gravitate through the perforations 19 in the bottom 8 of the trough.

As the potatoes reach the upward incline of the trough 6, the solution which they displace rises above the liquid level 17 and flows away on all sides toward said level, creating a turbulence which cleans the immediate region of the solution from which the potatoes are to emerge from the skin debris which may be floating as a scum on the surface of the solution. Thus, the potatoes reach the upper inclined end of the trough and conveyor in a substantially clean state so that very little skin debris is discharged with them as they pass down the chute 3 into the washer.

It is to be noted that the vanes 15 of the conveyor are preferably provided with perforations 20, causing a relative back flow of the solution within the trough 6 as the potatoes move forward. This provides an additional means for bringing lye solution into intimate contact with the potatoes and in freeing them from the particles of skin debris through the jet action of the water impinging upon the potatoes.

While I have in the above description disclosed what I believe to be a preferred and practical embodiment of the invention, it will be understood to those skilled in the art that the details of construction and the arrangement of parts as shown and described are by way of example, and not to be construed as limiting the scope of the invention as defined in the appended claims.

What I claim as my invention is:

1. Lye peeler comprising a tank, a trough mounted longitudinally therein spaced from the bottom and sides of said tank and positioned below the desired liquid level, having perforations in the sides and bottom throughout its submerged extent, an endless conveyor arranged longitudinally in said tank having the lower flight constituting a cover for said trough, transverse vanes carried at spaced intervals by said conveyor forming longitudinally movable partitions in said trough defining compartments in communication through said perforations with the body of liquid outside of said trough throughout the submerged portion of the path of travel of said compartments, means at one end of said tank for feeding potatoes to said conveyor, means remote from said feeding means permitting discharge of potatoes from said trough and tank, and heating means arranged along the sides of said tank outside of said trough.

2. Lye peeler comprising a tank, a trough mounted longitudinally therein having a substantially horizontal portion below the designed liquid level in said tank and a portion adjacent one end deflected inclinedly upward to a height above said liquid level, said trough being spaced from the sides and bottom of said tank and having perforations in its sides and bottom, an endless conveyor arranged longitudinally within said tank having its lower flight extending parallel respectively to the horizontal and upwardly inclined portion of said trough and closely adjacent thereto forming a cover for said trough, transverse vanes carried at spaced intervals by said conveyor forming longitudinally movable partitions in said trough defining compartments in communication through said perforations with the body of liquid outside of said trough throughout the submerged portion of the path of travel of said compartment, means communicating with one end of said trough for feeding potatoes to said conveyor and means at the upwardly inclined portion of said trough above said liquid level permitting discharge of potatoes from said trough and tank said trough being the sole current producing means in the body of liquid in said tank.

3. Lye peeler comprising a tank, a trough mounted longitudinally therein having a substantially horizontal portion below the designed liquid level in said tank and a portion adjacent one end deflected inclinedly upward above said liquid level, said trough being spaced from the sides and bottom of said tank and being perforated throughout its submerged portion, an endless conveyor arranged longitudinally within said tank having its lower flight extending parallel respectively to the horizontal and upwardly inclined portions of said trough and closely adjacent thereto forming a cover for said trough, transverse vanes carried at spaced intervals by said conveyor forming longitudinally movable partitions in said trough, means at one end of said trough for feeding potatoes to said conveyor, means at the upwardly inclined portion of said trough above said liquid level permitting discharge of potatoes from said trough and tank, said conveyor having marginal extensions beyond the sides of said trough, driving means at the ends of the circuit of said conveyor engaging said marginal extensions and direction changing rolls engaging said extensions respectively at the upper and lower flights of said conveyor in the region of direction change between the horizontal and upwardly inclined portion of said trough.

LOUIS E. KIBLER.